(12) United States Patent
Chang

(10) Patent No.: US 7,546,908 B2
(45) Date of Patent: Jun. 16, 2009

(54) WHEEL ASSEMBLY

(76) Inventor: Chin-Lin Chang, No. 636, Yuan-Huan E. Rd., Feng-Yuan City, Taichung Hsien (TW)

( * ) Notice: Subject to any disclaimer, the term of this patent is extended or adjusted under 35 U.S.C. 154(b) by 516 days.

(21) Appl. No.: 11/288,641

(22) Filed: Nov. 28, 2005

(65) Prior Publication Data
US 2007/0119661 A1 May 31, 2007

(51) Int. Cl.
*B60B 33/00* (2006.01)
(52) U.S. Cl. .................. 188/1.12; 188/29; 16/35 R
(58) Field of Classification Search ............. 188/1.12, 188/9, 19, 29, 57, 2 F; 301/6.1; 16/35 R, 16/18 R
See application file for complete search history.

(56) References Cited

U.S. PATENT DOCUMENTS

| | | | | |
|---|---|---|---|---|
| 3,571,842 A | * | 3/1971 | Fricke | 16/35 R |
| 3,890,669 A | * | 6/1975 | Reinhards | 16/35 R |
| 4,035,864 A | * | 7/1977 | Schroder | 16/35 R |
| 4,494,272 A | * | 1/1985 | Morita | 16/35 R |
| 6,532,624 B1 | * | 3/2003 | Yang | 16/35 R |

* cited by examiner

*Primary Examiner*—Pam Rodriguez
(74) *Attorney, Agent, or Firm*—patenttm.us

(57) ABSTRACT

A wheel assembly has a wheel bracket, a connecting base, a wheel and a brake device. The wheel bracket has a holding slot. The connecting base is rotatably mounted on the wheel bracket. The brake device is mounted on the wheel bracket, corresponds to the wheel and has a brake plate and a pushbutton. The brake plate is pivotally connected to the wheel bracket and has a first end, a second end and a securing tab. The first end corresponds to the wheel, and the second end corresponds to the connecting base. The securing tab is formed on the brake plate and is securely held inside the holding slot in the wheel brake to pivotally connect the brake plate to the wheel bracket. The pushbutton is pivotally attached to the wheel bracket and corresponds to the first end of the brake plate.

12 Claims, 6 Drawing Sheets

WHEEL ASSEMBLY

BACKGROUND OF THE INVENTION

1. Field of the Invention

The present invention relates to a wheel assembly, and more particularly to a wheel assembly with a brake device having a simplified structure and being easily assembled.

2. Description of Related Art

To make an object, such as a suitcase, a buggy, a cart or a buffet car to move freely, multiple wheel assemblies are mounted on the bottom of the object. Furthermore, a conventional wheel assembly may be provided with a brake device to slow down the movement of the object. With reference to FIG. 5, a conventional wheel assembly with a brake device (73) in accordance with the prior art comprises a wheel bracket (70), a connecting base (71), a wheel (76) and a brake device (73). The connecting base (71) is rotatably mounted on the wheel bracket (70) to connect with a moveable object and has a bottom provided with multiple teeth (72). The wheel (76) is rotatably mounted on the wheel bracket (70) with an axle. The brake device (73) is mounted on the wheel bracket (70), corresponds to the wheel (76) and comprises a brake plate (75) and pushbutton (74). The brake plate (75) is pivotally attached to the bottom of the wheel bracket (70) with a pivot and has a first end, a second end and an abutting tab (751). The first end of the brake plate (75) corresponds to the wheel (76), and the second end of the brake plate (75) has teeth (752) selectively engaging with the teeth (72) on the connecting base (71). The abutting tab (751) laterally extending from the brake plate (75) near the pivot and abuts against the bottom of the wheel bracket (70). The pushbutton (74) is pivotally attached to the wheel bracket (70) and has a protrusion (741) corresponding to the first end of the brake plate (75).

When the pushbutton (74) is pressed, the first end of the brake plate (75) will be pushed to abut against the wheel (76) by the protrusion (741) such that a brake effect is provided. At the same time, the second end of the brake plate (75) moves upward to make the teeth (752) engage with the teeth (72) on the connecting base (71) to provide a positioning device to the connecting base (71).

However, to pivotally attach the brake plate (75) on the wheel bracket (70) with the pivot is troublesome and time-consuming.

With reference to FIG. 6, another conventional wheel assembly in accordance with the prior art comprises a wheel bracket (80), a connecting base (81), a wheel (86) and a brake device (82). The brake device (82) comprises a brake plate (84), a torsion spring (85) and a pushbutton (83). The brake plate (84) is pivotally mounted on the wheel bracket (80) with a pivot, and the torsion spring (85) is mounted around the pivot and has two ends abutting respectively against the wheel bracket (80) and the brake plate (84). The pushbutton (83) is pivotally attached to the wheel bracket (80) and abuts with the brake plate (84). When the pushbutton (83) is pressed, the brake plate (84) is pushed to abut against the wheel (86) to provide a brake effect.

However, the conventional wheel assembly has a complex structure and is difficult to assemble.

To overcome the shortcomings, the present invention tends to provide a wheel assembly to mitigate or obviate the aforementioned problems.

SUMMARY OF THE INVENTION

The main objective of the invention is to provide a wheel assembly with a brake device having a simplified structure and being conveniently assembled. The wheel assembly has a wheel bracket, a connecting base, a wheel and a brake device. The wheel bracket has a bottom and a holding slot defined in the bottom. The connecting base is rotatably mounted on the wheel bracket to connect with a moveable object and has a bottom provided with multiple teeth. The wheel is rotatably mounted on the wheel bracket with an axle. The brake device is mounted on the wheel bracket, corresponds to the wheel and has a brake plate and a pushbutton. The brake plate is pivotally connected to the wheel bracket and has a first end, a second end and a securing tab. The first end corresponds to the wheel, and the second end corresponds to the connecting base and has a hook selectively engaging with the teeth on the connecting base. The securing tab is formed on the brake plate and is securely held inside the holding slot in the wheel brake to pivotally connect the brake plate to the wheel bracket. The pushbutton is pivotally attached to the wheel bracket and corresponds to the first end of the brake plate to push the first end of the brake plate to abut against the wheel when the pushbutton is pressed.

Other objects, advantages and novel features of the invention will become more apparent from the following detailed description when taken in conjunction with the accompanying drawings.

DETAILED DESCRIPTION OF PREFERRED EMBODIMENT

Figure 1:
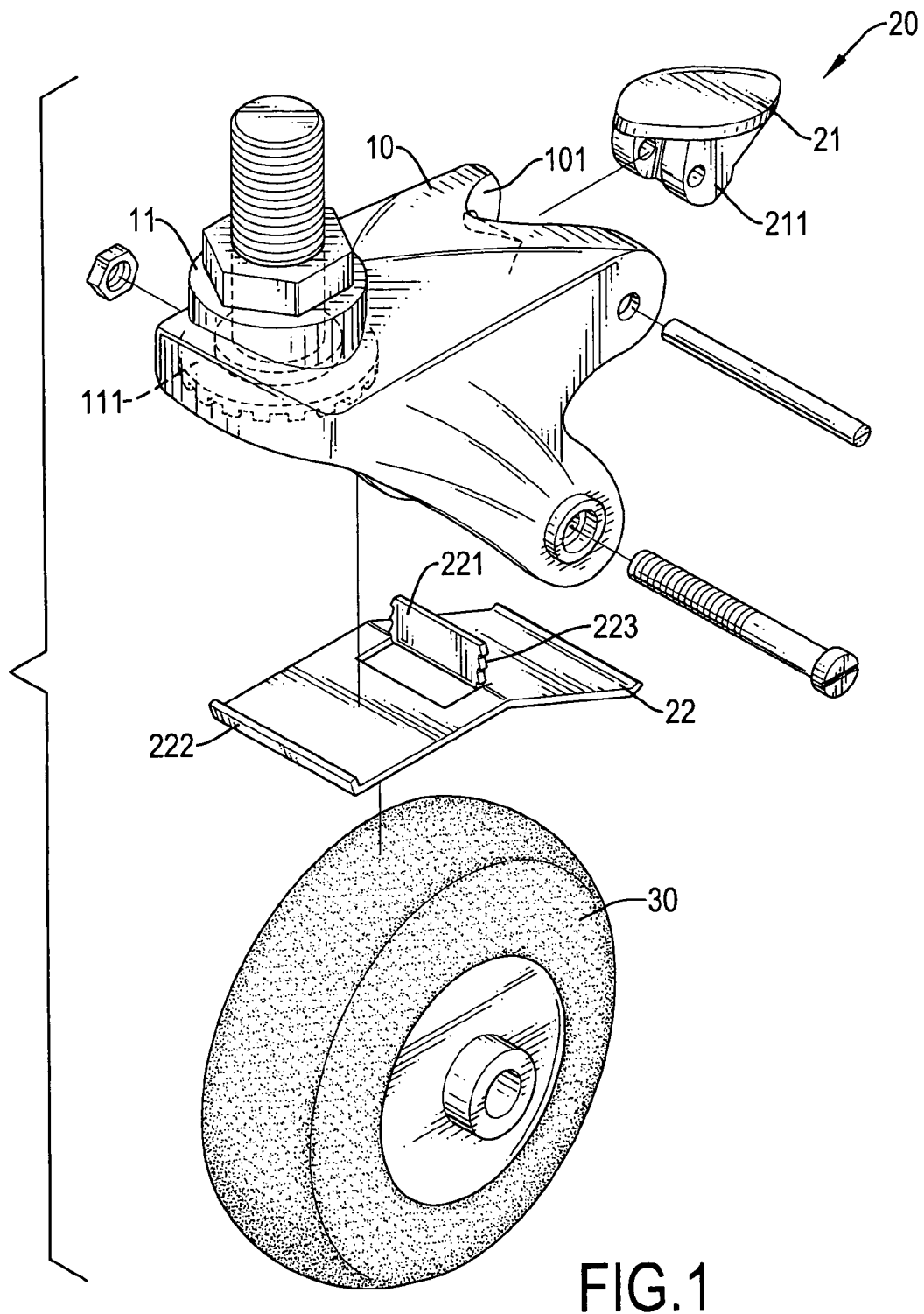
FIG. 1 is an exploded perspective view of a wheel assembly in accordance with the present invention.
Figure 2:
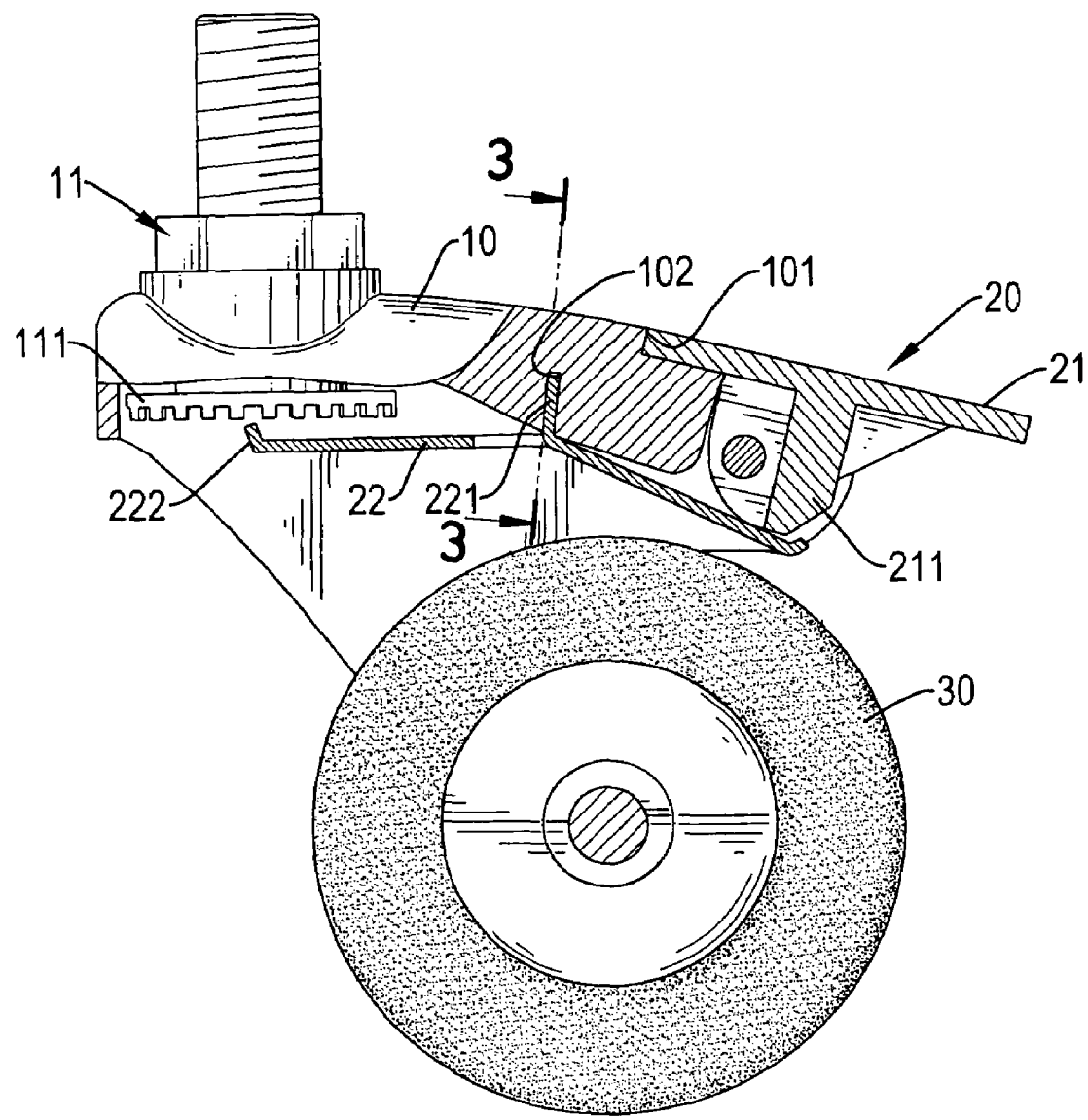
FIG. 2 is a side plan view in partial cross section of the wheel assembly in FIG. 1.
Figure 3:
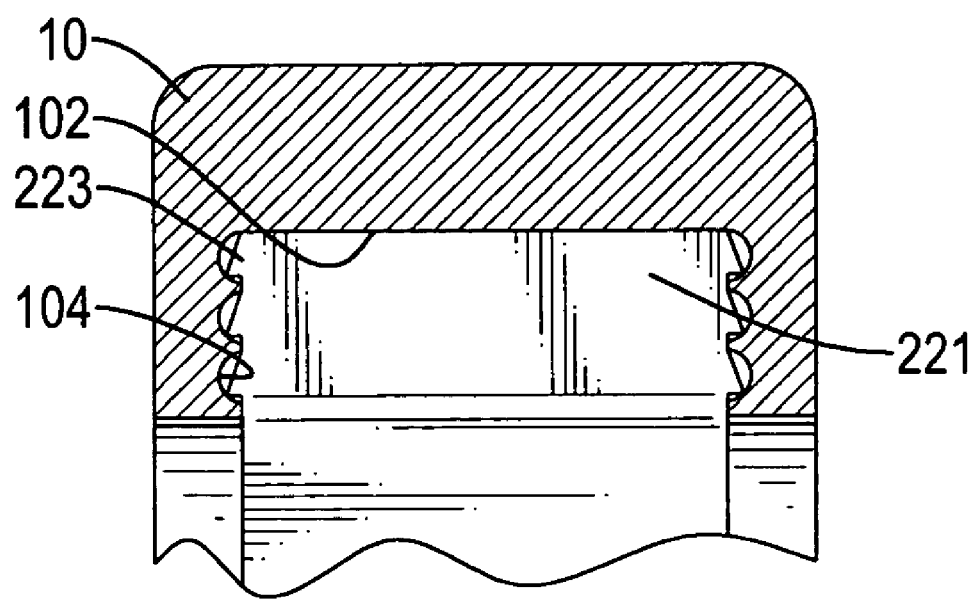
FIG. 3 is an enlarged side view in partial cross section of the holding slot in the wheel bracket and the securing tab on the brake plate of the wheel assembly along line 3-3 in FIG. 2.

With reference to FIGS. 1 to 3, a wheel assembly in accordance with the present invention comprises a wheel bracket (10), a connecting base (11), a wheel (30) and a brake device (20). The wheel bracket (10) has a bottom and a holding slot (102) defined in the bottom. A recess (101) is defined in one end of the wheel bracket (10).

The connecting base (11) is rotatably mounted on the wheel bracket (10) to connect with a moveable object, such as a suitcase, a buggy, a cart or a buffet car. The connecting base

(11) has a bottom provided with multiple teeth (111). The wheel (30) is rotatably mounted on the wheel bracket (10) with an axle.

The brake device (20) is mounted on the wheel bracket (10), corresponds to the wheel (30) and comprises a brake plate (22) and a pushbutton (21). The brake plate (22) is pivotally connected to the wheel bracket (10) and has a first end, a second end and a securing tab (221). The first end corresponds to the wheel (30), and the second end corresponds to the connecting base (11) and has a hook (222) selectively engaging with the teeth (111) on the connecting base (11). The securing tab (221) is formed on the brake plate (22) and is securely held inside the holding slot (102) in the wheel brake (10) to pivotally connect the brake plate (22) to the wheel bracket (10). In a preferred embodiment, the first end of the brake plate (22) is inclined relative to the second end of the brake plate (22), and the securing tab (221) is formed at a joint between the first end and the second end. The securing tab (221) has two sides and multiple teeth (223) formed on each side, and the holding slot (102) in the wheel bracket (10) has two inner sides and multiple cutouts (104) defined in the inner sides and engaging respectively with the teeth (223) on the securing tab (22). With the engagement between the teeth (223) on the securing tab (221) and the cutouts (104) in the holding slot (102), the combination between the securing tab (221) and the holding slot (102) is enhanced.

The pushbutton (21) is pivotally attached to the wheel bracket (10), is partially held inside the recess (101) in the wheel bracket (10) and corresponds to the first end of the brake plate (22). Two protrusions (211) are formed on and extend from the bottom of the pushbutton (21) and abut against the first end of the brake plate (22).

Figure 4:
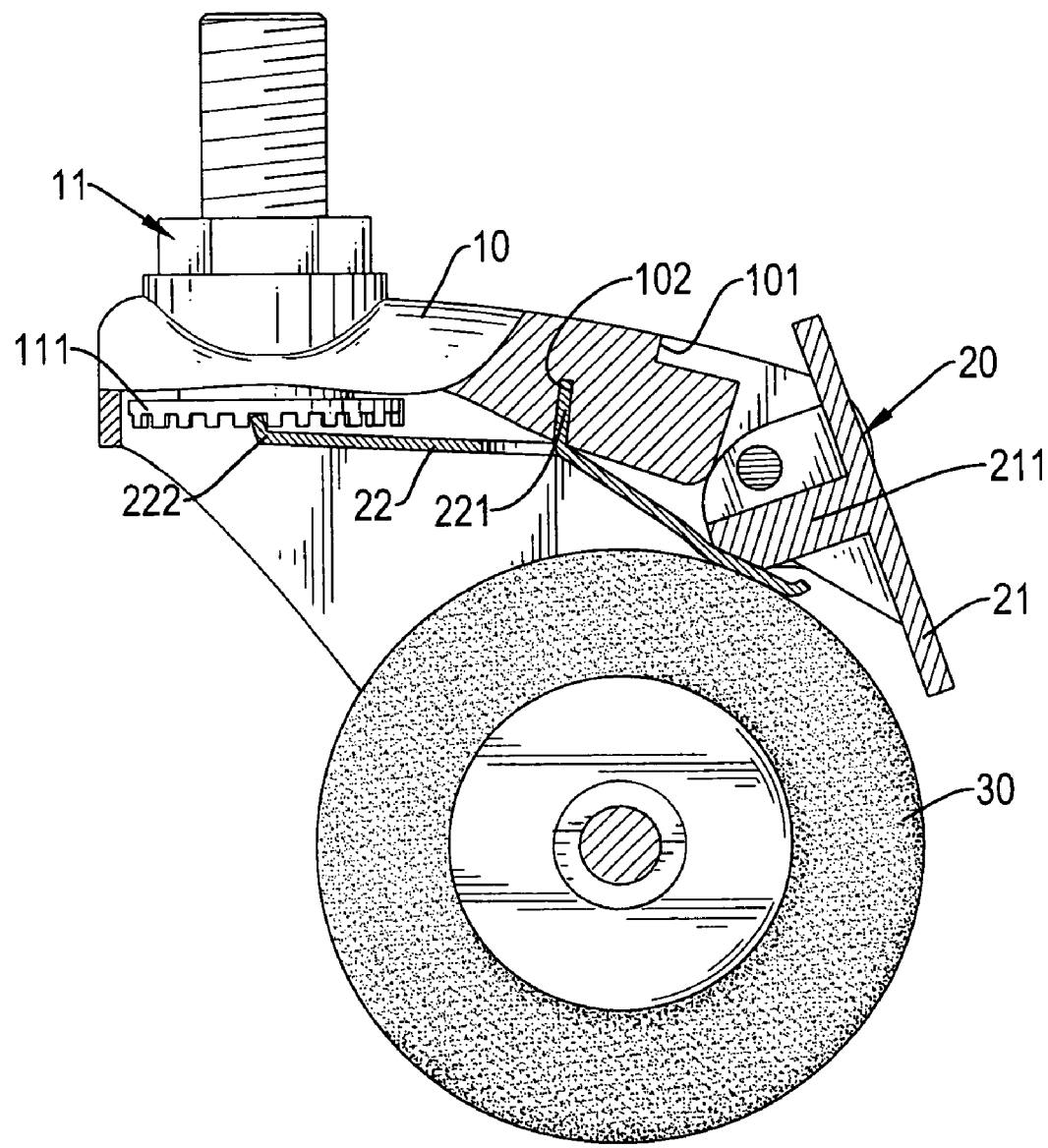
FIG. 4 is an operational side plan view in partial cross section of the wheel assembly in FIG. 1 showing that the pushbutton is pressed.
Figure 5:
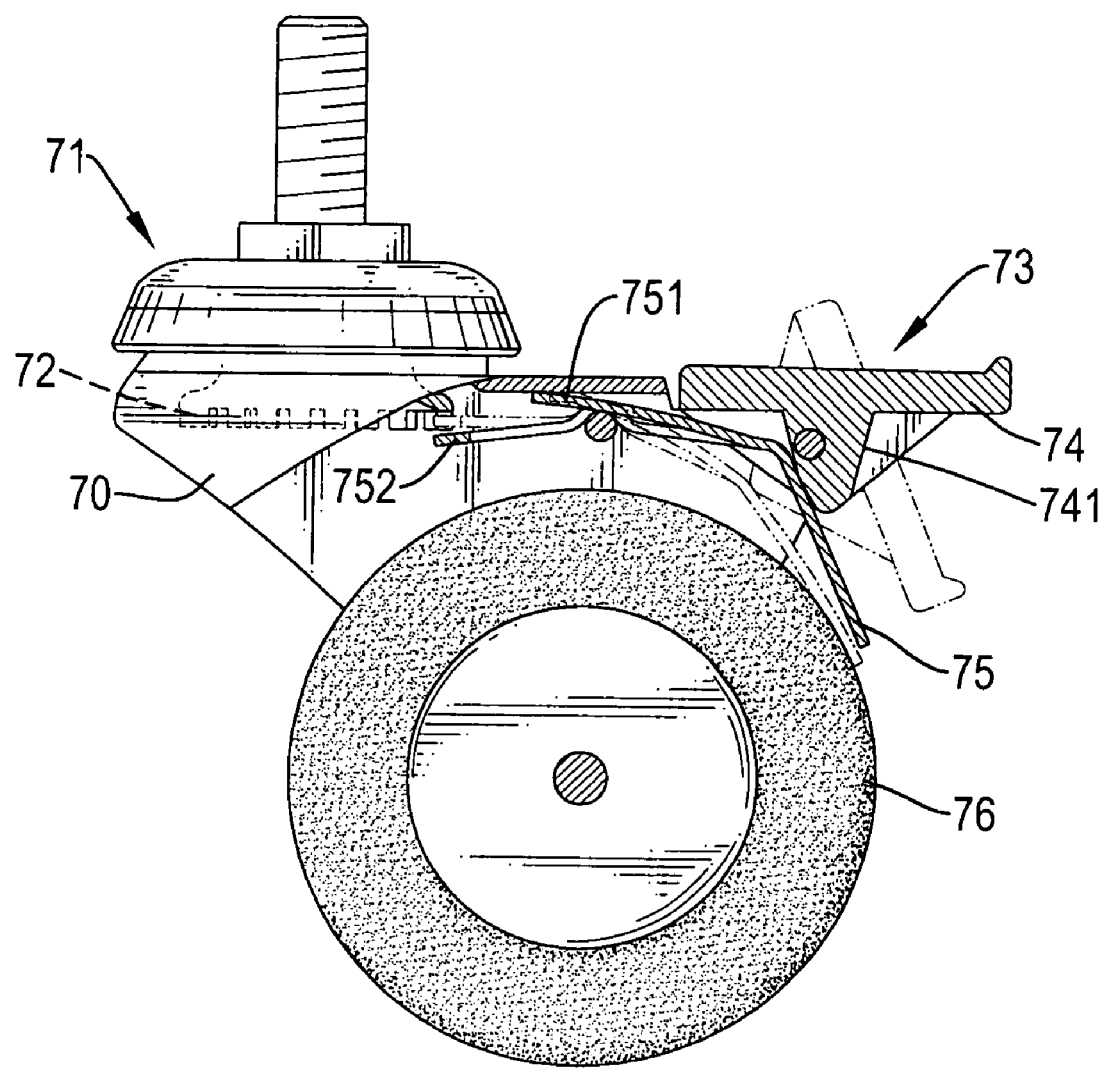
FIG. 5 is an operational side plan view in partial cross section of a conventional wheel assembly with a brake device in accordance with the prior art.
Figure 6:
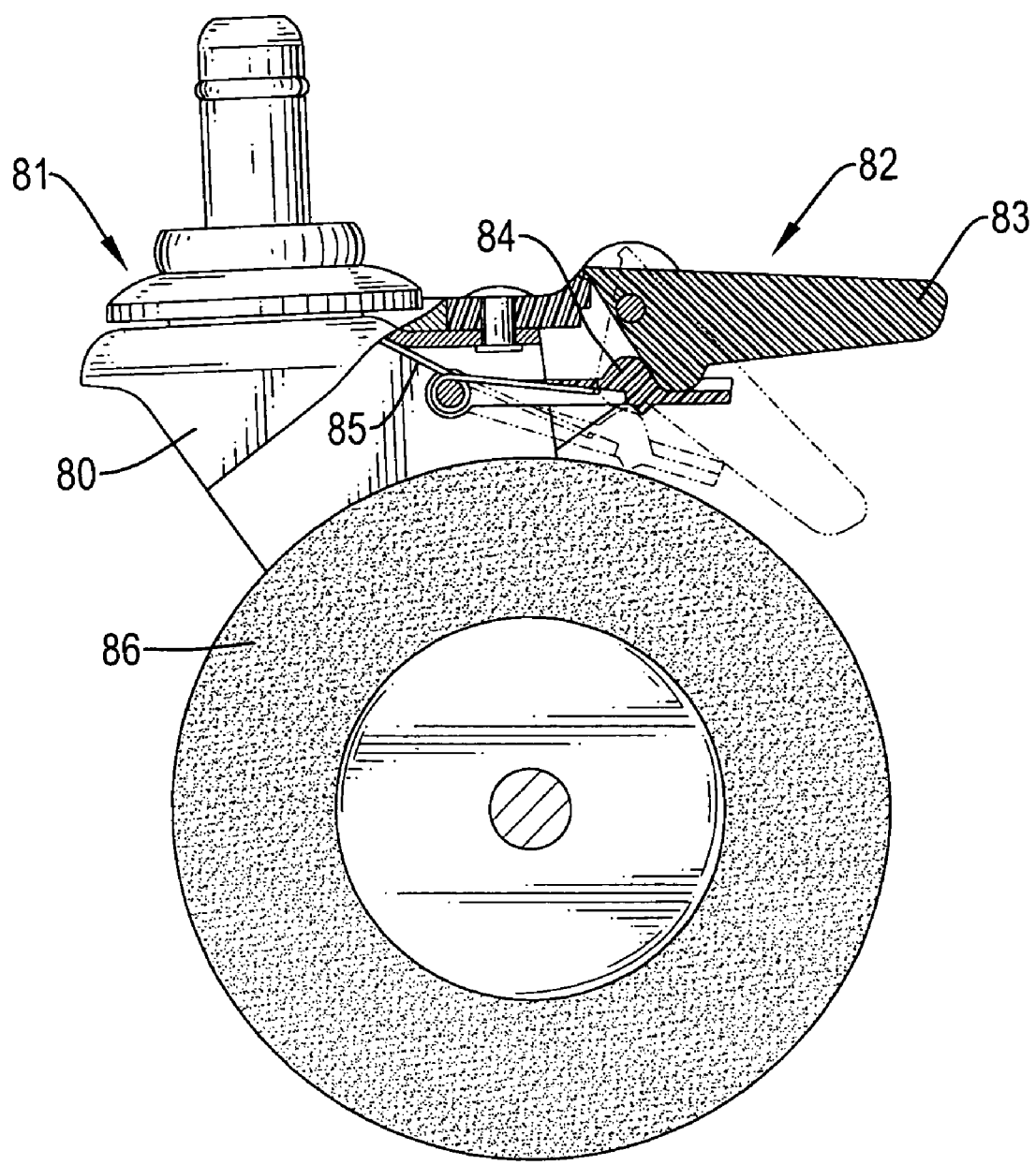
FIG. 6 is an operational side plan view in partial cross section of another conventional wheel assembly with a brake device in accordance with the prior art.

When the pushbutton (21) is pressed, with further reference to FIG. 4, the first end of the brake plate (22) is pushed to abut against the wheel so as to provide a brake effect to the wheel (30). In the meantime, the second end of the brake plate (22) moves upward to make the hook (222) engage with the teeth (111) on the connecting base (11). Accordingly, the connecting base (11) is kept from rotation relative to the wheel bracket (10), and a positioning effect is provided.

Because to pivotally connect the brake plate (22) to the wheel bracket (10) is to insert the securing tab (221) into the holding slot (102), to assemble the wheel assembly in accordance with the present invention is convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wheel assembly comprising:
   a wheel bracket having a bottom and a holding slot defined in the bottom;
   a connecting base rotatably mounted on the wheel bracket to connect with a moveable object and having a bottom provided with multiple teeth;
   a wheel rotatably mounted on the wheel bracket with an axle; and
   a brake device mounted on the wheel bracket, corresponding to the wheel and comprising
   a brake plate pivotally connected to the wheel bracket and having
   a first end corresponding to the wheel;
   a second end corresponding to the connecting base and having a hook selectively engaging with the teeth on the connecting base; and
   a securing tab formed on the brake plate and securely held inside the holding slot in the wheel brake to pivotally connect the brake plate to the wheel bracket; and
   a pushbutton pivotally attached to the wheel bracket and corresponding to the first end of the brake plate to push the first end of the brake plate to abut against the wheel when the pushbutton is pressed, wherein
   the first end of the brake plate is inclined relative to the second end of the brake plate; and
   the securing tab is formed at a joint between the first end and the second end.

2. The wheel assembly as claimed in claim 1, wherein the securing tab has two sides and multiple teeth formed on each side; and
   the holding slot has two inner sides and multiple cutouts defined in the inner sides and engaging respectively with the teeth on the securing tab.

3. The wheel assembly as claimed in claim 2, wherein the wheel bracket has a recess for partially holding the pushbutton inside.

4. The wheel assembly as claimed in claim 3, wherein the pushbutton has a bottom and two protrusions formed on and extending from the bottom and abutting against the first end of the brake plate.

5. The wheel assembly as claimed in claim 1, wherein the wheel bracket has a recess for partially holding the pushbutton inside.

6. The wheel assembly as claimed in claim 5, wherein the pushbutton has a bottom and two protrusions formed on and extending from the bottom and abutting against the first end of the brake plate.

7. The wheel assembly as claimed in claim 1, wherein the pushbutton has a bottom and two protrusions formed on and extending from the bottom and abutting against the first end of the brake plate.

8. The wheel assembly as claimed in claim 1, wherein the securing tab has two sides and multiple teeth formed on each side.

9. A wheel assembly comprising:
   a wheel bracket having a bottom and a holding slot defined in the bottom;
   a connecting base rotatably mounted on the wheel bracket to connect with a moveable object and having a bottom provided with multiple teeth;
   a wheel rotatably mounted on the wheel bracket with an axle; and
   a brake device mounted on the wheel bracket, corresponding to the wheel and comprising
   a brake plate pivotally connected to the wheel bracket and having
   a first end corresponding to the wheel;
   a second end corresponding to the connecting base and having a hook selectively engaging with the teeth on the connecting base; and
   a securing tab formed on the brake plate and securely held inside the holding slot in the wheel brake to pivotally connect the brake plate to the wheel bracket; and
   a pushbutton pivotally attached to the wheel bracket and corresponding to the first end of the brake plate to push the first end of the brake plate to abut against the wheel when the pushbutton is pressed,
   wherein the securing tab has two sides and multiple teeth formed on each side.

10. A wheel assembly comprising:

a wheel bracket having a bottom and a holding slot defined in the bottom;

a connecting base rotatably mounted on the wheel bracket to connect with a moveable object and having a bottom provided with multiple teeth;

a wheel rotatably mounted on the wheel bracket with an axle; and a brake device mounted on the wheel bracket, corresponding to the wheel and comprising a brake plate pivotally connected to the wheel bracket and having a first end corresponding to the wheel;

a second end corresponding to the connecting base and having a hook selectively engaging with the teeth on the connecting base; and a securing tab formed on the brake plate and securely held inside the holding slot in the wheel brake to pivotally connect the brake plate to the wheel bracket; and a pushbutton pivotally attached to the wheel bracket and corresponding to the first end of the brake plate to push the first end of the brake plate to abut against the wheel when the pushbutton is pressed, wherein the securing tab has two sides and multiple teeth formed on each side; and the holding slot has two inner sides and multiple cutouts defined in the inner sides and engaging respectively with the teeth on the securing tab.

11. The wheel assembly as claimed in claim 10, wherein the wheel bracket has a recess for partially holding the pushbutton inside.

12. The wheel assembly as claimed in claim 11, wherein the pushbutton has a bottom and two protrusions formed on and extending from the bottom and abutting against the first end of the brake plate.

\* \* \* \* \*